No. 729,837. PATENTED JUNE 2, 1903.
C. W. BILFINGER.
PAINT VEHICLE.
APPLICATION FILED APR. 9, 1902.
NO MODEL.
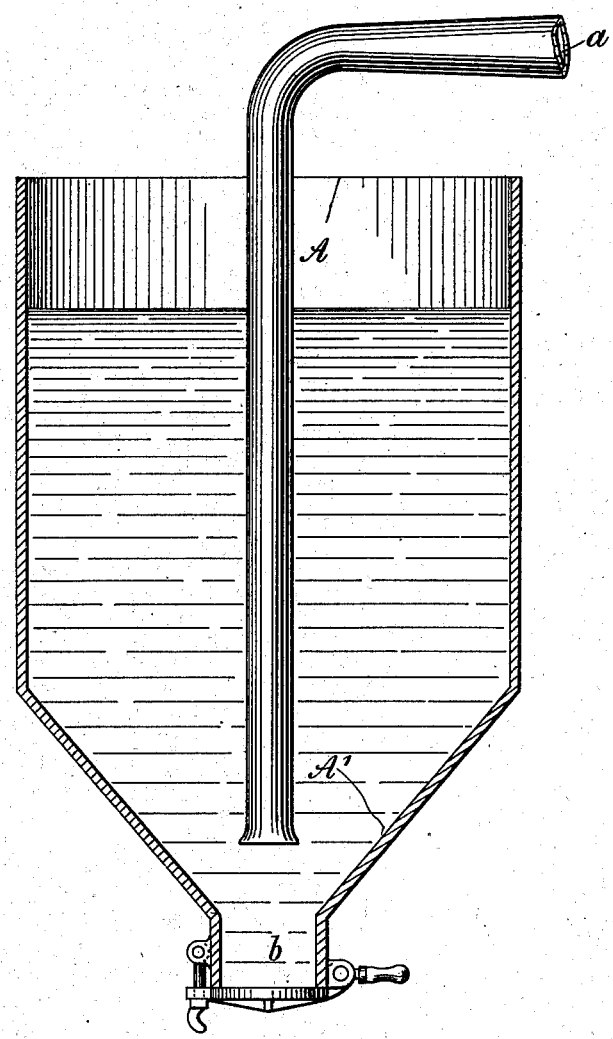

No. 729,837. Patented June 2, 1903.

UNITED STATES PATENT OFFICE.

CARL W. BILFINGER, OF FAYETTEVILLE, NORTH CAROLINA, ASSIGNOR OF ONE-HALF TO WILLIAM M. MORGAN, OF FAYETTEVILLE, NORTH CAROLINA.

PAINT VEHICLE.

SPECIFICATION forming part of Letters Patent No. 729,837, dated June 2, 1903.

Application filed April 9, 1902. Serial No. 102,061. (No specimens.)

*To all whom it may concern:*

Be it known that I, CARL W. BILFINGER, a citizen of the United States, and a resident of Fayetteville, State of North Carolina, have invented certain new and useful improvements in paint vehicles having the properties of pure linseed-oil and suitable for use in grinding and preparing colors in the same manner and with the same effect as linseed-oil is used, of which the following is a specification.

My invention relates to producing, refining, and rectifying fatty substances and combining them with others; and it consists in the hereinafter described and claimed product.

Linseed-oil is especially adapted for grinding and preparing colors, owing to certain qualities which it possesses and which are not possessed by other oils.

I have discovered that a very efficient substitute for linseed-oil and one that possesses all the qualities of linseed-oil in the same degree can be produced of the so-called "creosote" or "tar" oil, oxid of lead, and cotton-seed oil, which is the most common and cheapest vegetable oil.

The creosote or tar oil referred to herein is intended to designate pine-oil or other oil containing creosote.

In producing this substitute for linseed-oil I take crude creosote or tar oil as it is produced by my process of distilling wood set forth in the United States Letters Patent No. 674,491, granted to me on the 21st day of May, 1901, to which I refer, and first extract from this oil the pyrolignic acid contained therein. For this purpose the creosote-oil is filled in the tank of the apparatus, as shown in the accompanying drawing, showing a sectional view thereof. The apparatus consists of a tank A, having a funnel-shaped bottom A', terminating into an outlet-pipe $b$, and of an air-blast apparatus, preferably a rotary blower, the outlet-pipe $a$ of which is let into the tank and terminates a few inches above the bottom of the tank. The creosote-oil, as set forth, is filled into the tank A, and the air-blast apparatus is turned on, driving air forcibly into the oil, and thereby agitating it in a manner similar as if boiling. Then some alkali, preferably caustic soda in pulverized state, is added to the oil, the quantity required being approximately one pound of pulverized caustic soda per each fifty gallons of oil. The requisite quantity of the caustic soda must be added to the oil successively—not all at once—and then the agitating of the oil by the blowing of the air is continued for about twenty minutes longer, whereupon the liquid in the tank is allowed to settle. The alkali, preferably caustic soda, extracts from the oil and neutralizes all pyrolignic acid, and the composition of matter thus produced settles in the form of soapy sediment in the bottom of the tank. This sediment is discharged through the outlet-pipe $b$. Then an approximately equal quantity of water is added to the oil in the tank and the air-blast turned on again and maintained for about twenty minutes to one-half an hour longer, whereupon the liquid in the tank is again allowed to settle. The water absorbs and partly dissolves all impurities that might have remained in the oil and settles, together with any solid matter, in the bottom of the tank, whereas the oil rises to the top. This water and the sediments are again discharged through the outlet-pipe $b$, whereupon the oil is "dried." For this purpose the air-blast apparatus is again set in action and the air-blast maintained for approximately two hours. The air absorbs and evaporates all particles of water that may yet be contained in the oil, so that the oil in the tank after this air-blowing is completed is absolutely free from moisture. Next a quantity of oxid of lead is added to the oil in small installments. The quantity to be added is approximately five pounds of oxid of lead for every fifty gallons of the oil; but this proportion may vary somewhat—in some instances more being necessary, in others less. I have not been able to discover an exact rule by which to determine the quantity of the oxid of lead to be added beforehand; but there is no difficulty in determining the exact quantity required in each particular case if a reliable instrument is used for measuring the consistency of the substance resulting from the absorption of the oxid of lead by the oil and which should not exceed that of linseed-oil by more than 8° to obtain the best results. The abatement of the agitation of the mixture and of the foaming indicates that the oxid of lead is absolutely absorbed by the oil. This will require on the average about thirty minutes, and the resulting product appears clear and free from bubbles. This product may now be drawn off and stored for future use, or it may be immediately mixed with cotton-seed oil, (or other vegetable oil,) an equal quantity of each being taken and the mixture agitated in a tank by an air-blast apparatus operating in the same manner as explained above to facilitate a more complete mixing with or absorption of the cotton-seed oil by the modified creosote-oil. After the air-blast is stopped the mixture is permitted to settle. There is no chemical transformation produced by this combining of the cotton-seed oil with the modified creosote-oil, but a complete and absolute mixture of the two substances and their assimilation by each other.

The mixture is approximately of the same consistency and specific gravity as linseed-oil and, as I have found through my experiments, possesses for the purpose of grinding and preparing of colors the same properties and in the same degree as pure linseed-oil.

I claim as my invention—

1. A paint vehicle composed of creosote-oil, vegetable oil, and oxid of lead, the creosote and vegetable oil being approximately of equal proportion.

2. A paint vehicle composed of creosote-oil, cotton-seed oil, and of oxid of lead, the creosote-oil and cotton-seed oil being approximately of equal proportions.

CARL W. BILFINGER.

Witnesses:
M. A. HELMKE,
B. R. MARTIN.